(12) United States Patent
Cao et al.

(10) Patent No.: US 12,235,562 B2
(45) Date of Patent: Feb. 25, 2025

(54) DISPLAY DEVICE

(71) Applicant: BOE Technology Group Co., Ltd., Beijing (CN)

(72) Inventors: Lei Cao, Beijing (CN); Junmin Sun, Beijing (CN); Jinggang Wei, Beijing (CN); Wenbin Wang, Beijing (CN); Zifeng Wang, Beijing (CN); Yan Ren, Beijing (CN); Yunpeng Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 552 days.

(21) Appl. No.: 17/574,407

(22) Filed: Jan. 12, 2022

(65) Prior Publication Data

US 2022/0299834 A1 Sep. 22, 2022

(30) Foreign Application Priority Data

Mar. 22, 2021 (CN) .......................... 202120581066.X

(51) Int. Cl.
| | | |
|---|---|---|
| *G02B 5/126* | (2006.01) | |
| *G02F 1/1333* | (2006.01) | |
| *G02F 1/167* | (2019.01) | |
| *G02F 1/16753* | (2019.01) | |
| *G09F 3/20* | (2006.01) | |
| *G09F 9/30* | (2006.01) | |
| *G09F 21/02* | (2006.01) | |

(52) U.S. Cl.
CPC .... *G02F 1/16753* (2019.01); *G02F 1/133311* (2021.01); *G02F 1/133314* (2021.01); *G02F 1/13332* (2021.01); *G02F 1/167* (2013.01); *G09F 3/207* (2013.01); *G09F 9/30* (2013.01); *G09F 21/02* (2013.01); *G02F 2202/28* (2013.01)

(58) Field of Classification Search
CPC ........... G02F 1/16753; G02F 1/133311; G02F 1/133314; G02F 1/13332; G02F 1/167; G02F 2202/28; G09F 3/207; G09F 9/30; G09F 21/02
See application file for complete search history.

(56) References Cited

U.S. PATENT DOCUMENTS

| | | | | |
|---|---|---|---|---|
| 11,641,721 | B2 * | 5/2023 | Cao .......................... | G09F 9/372 |
| | | | | 361/807 |
| 2014/0125911 | A1 * | 5/2014 | Lee ................... | G02F 1/133608 |
| | | | | 361/679.26 |
| 2022/0187674 | A1 * | 6/2022 | Cao .......................... | G02F 1/167 |

* cited by examiner

*Primary Examiner* — Euncha P Cherry
(74) *Attorney, Agent, or Firm* — IPro, PLLC

(57) ABSTRACT

Disclosed is a display device including a cover plate, a display panel, a first circuit board, and a rear housing, wherein the cover plate is connected to the rear housing to form an accommodation space, the display panel is assembled with the first circuit board and is disposed in the accommodation space, and the first circuit board includes a first extension portion and a second extension portion, wherein the first extension portion and the second extension portion are connected, the first extension portion extends in a first direction and is attached to the display panel, and the second extension portion extends in a second direction and is attached to the display panel, the first direction being intersected with the second direction.

17 Claims, 8 Drawing Sheets

DISPLAY DEVICE

CROSS-REFERENCE TO RELATED APPLICATION

This application is based on and claims priority to the Chinese Patent Application No. 202120581066.X, filed Mar. 22, 2021 and entitled "DISPLAY PANEL," the disclosure of which is herein incorporated by reference in its entirety.

TECHNICAL FIELD

The present disclosure relates to the field of display technologies, and in particular, relates to a display device.

BACKGROUND

With the popularity of the display technology, the application range of the display technology is being enlarged.

SUMMARY

Embodiments of the present disclosure provide a display device.

The display device includes: a cover plate, a display panel, a first circuit board, and a rear housing, wherein the cover plate is connected to the rear housing to form an accommodation space, the display panel is assembled with the first circuit board, both the display panel and the first circuit board are disposed in the accommodation space, and the first circuit board includes a first extension portion and a second extension portion, wherein the first extension portion and the second extension portion are connected, the first extension portion extends in a first direction and is attached to the display panel, and the second extension portion extends in a second direction and is attached to the display panel, the first direction being intersected with the second direction.

In some embodiments, the first direction is perpendicular to the second direction.

In some embodiments, the rear housing includes a bottom plate, two first side plates, and two second side plates, wherein the two second side plates are connected between the two first side plates to form a rectangular frame, the rectangular frame is disposed around an edge of the bottom plate, the first side plate extends in the first direction, and the second side plate extends in the second direction.

In some embodiments, the display panel is a flexible display panel.

In some embodiments, the display panel is an electrophoretic display panel.

In some embodiments, the display device is an electronic badge.

In some embodiments, the display device further includes a Bluetooth module and a second circuit board, wherein the Bluetooth module and the second circuit board are disposed in the accommodation space, the Bluetooth module is attached to an inner wall of the rear housing, and the Bluetooth module and the second circuit board are electrically connected.

In some embodiments, the Bluetooth module is an elongated strip, the Bluetooth module is attached to the inner wall of the rear housing, and a lengthwise direction of the Bluetooth module is the same as the extension direction of the side of the rear housing.

In some embodiments, the display device further includes an electrical connection portion in the accommodation space, wherein the electrical connection portion is electrically connected to the second circuit board; and the Bluetooth module includes a pin, wherein the pin is snap-fitted to the electrical connection portion to achieve an electrical connection between the Bluetooth module and the second circuit board.

In some embodiments, the second circuit board is disposed on a side, opposite to the first extension portion, of the second extension portion.

In some embodiments, the display device further includes buttons, wherein one of the buttons includes a plastic body, a waterproof double-sided adhesive, and a silicone gasket, the waterproof double-sided adhesive and the silicone gasket being sequentially sleeved on the plastic body; and wherein a first through hole is disposed on a side plate of the rear housing, the plastic body is disposed in the first through hole and the waterproof double-sided adhesive is adhered to an inner wall of the side plate of the rear housing.

In some embodiments, the display device further includes a silicone housing, wherein the rear housing is snap-fitted to the silicone housing, a second through hole is disposed on the silicone housing, the second through hole being disposed at a position corresponding to the first through hole, and the plastic body is disposed in the second through hole, the plastic body being exposed outside the silicone housing.

In some embodiments, the display device further includes a hook, wherein the hook is connected to a side wall of the silicone housing.

In some embodiments, the silicone housing includes a first side wall extending in the first direction and a second side wall extending in the second direction, wherein a third through hole is disposed on the first side wall, a fourth through hole is disposed on the second side wall, a first groove is disposed on a position, corresponding to the third through hole, of the rear housing, a second groove is disposed on a position, corresponding to the fourth through hole, of the rear housing, and one end of the hook includes a hook-shaped protrusion, and the hook is disposed in one of the following fashions: the hook is disposed in the third through hole and the hook-shaped protrusion is snap-fitted to the first groove; and the hook is disposed in the fourth through hole and the hook-shaped protrusion is snap-fitted to the second groove.

In some embodiments, the display device further includes a through hole plug, wherein the through hole plug is configured to be inserted into the through holes of the third through hole or the fourth through hole in which the hook is not disposed to seal the through hole.

In some embodiments, the display device further includes a battery, wherein the battery is disposed in the accommodation space and in a space enclosed by the first extension portion and the second extension portion.

In some embodiments, the display device further includes a badge, wherein the badge is interposed between the silicone housing and the rear housing.

In some embodiments, the cover plate and the rear housing are bonded to each other by a waterproof double-sided adhesive.

BRIEF DESCRIPTION OF THE DRAWINGS

For clearer descriptions of the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without any creative efforts.

DETAILED DESCRIPTION

For clearer illustrations of the objectives, technical solutions, and advantages of the present disclosure, the present disclosure will be further described in detail below in conjunction with specific embodiments and with reference to the accompanying drawings.

It should be noted that, unless otherwise defined, the technical or scientific terms used in the present disclosure should be given the ordinary meanings as understood by those with ordinary skill in the art to which this disclosure belongs. The terms "first," "second," and the like used in the present disclosure do not indicate any order, quantity or importance, but are only used to distinguish different components. The terms "include," "comprise," and variations thereof mean that the element or item appearing in front of the word covers the element or item listed behind the word and its equivalents, but does not exclude other elements or items. The terms "coupled," "connected," and the like are not to be limited to physical or mechanical connections, but include electrical connections, whether direct or indirect. The terms "up," "down," "left," "right," and the like are only used to indicate the relative position relationship. In the case that the absolute position of the described object changes, the relative position relationship may also change accordingly.

Figure 1:
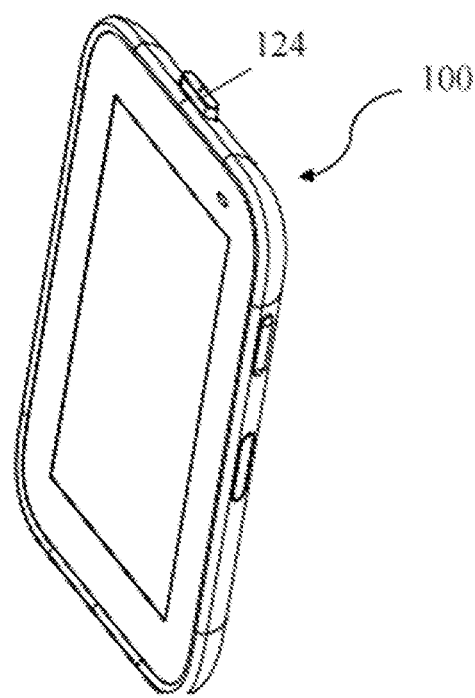
FIG. 1 is a schematic diagram of a three-dimensional structure of an exemplary display device according to an embodiment of the present disclosure.
Figure 2:
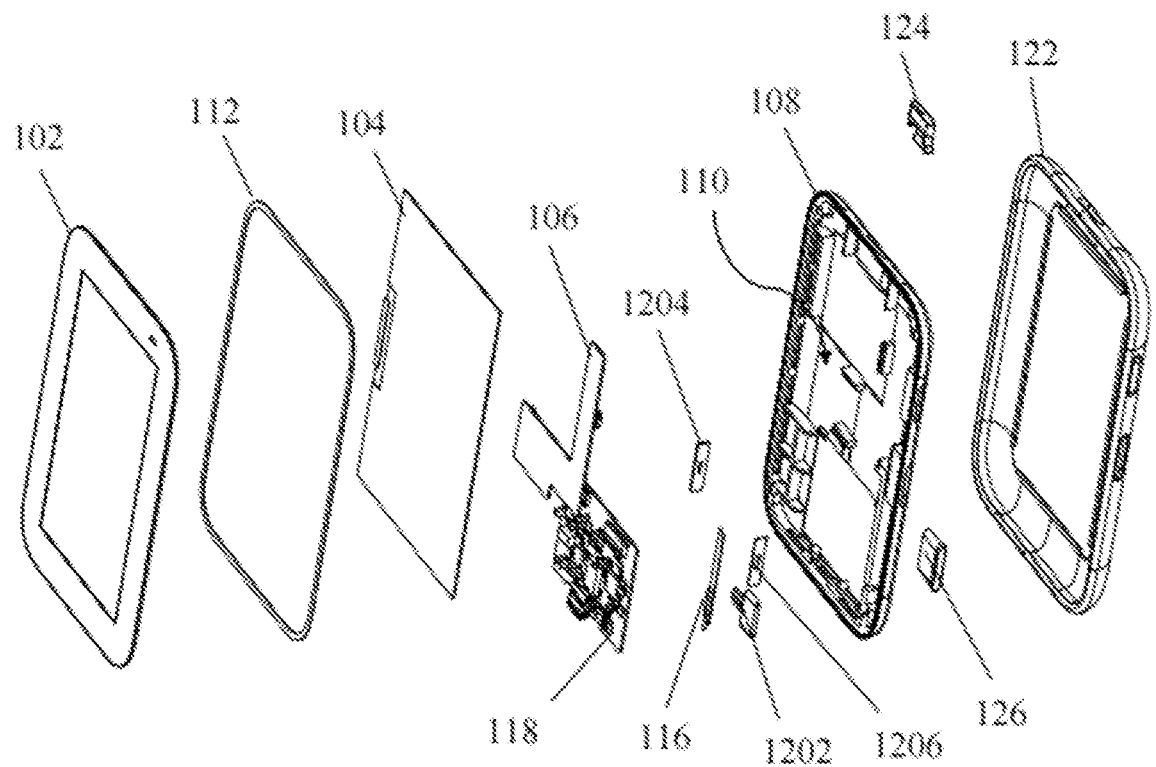
FIG. 2 is a structural exploded view of an exemplary display device according to an embodiment of the present disclosure.

FIG. 1 is a schematic diagram of a three-dimensional structure of an exemplary display device according to an embodiment of the present disclosure. FIG. 2 is a structural exploded view of an exemplary display device according to an embodiment of the present disclosure.

As shown in FIGS. 1 and 2, the display device 100 may include a cover plate 102, a display panel 104, a first circuit board 106, and a rear housing 108. The cover plate 102 and the rear housing 108 are connected to form an accommodation space 110. The accommodation space 110 is configured to accommodate internal components of the display device 100, such as circuit boards, batteries, various communication modules, and the like. In some embodiments, as shown in FIG. 2, the cover plate 102 and the rear housing 108 may be bonded to each other by a waterproof double-faced adhesive 112, thereby improving the waterproof performance.

As shown in FIG. 2, in some embodiments, the display panel 104 and the first circuit board 106 may be assembled together and then accommodated in the accommodation space 110. Thus, the cover plate is connected to the rear housing to form an accommodation space, and the display panel and the first circuit board are assembled in the accommodation space, which improves overall compactness of the product.

Figure 3:
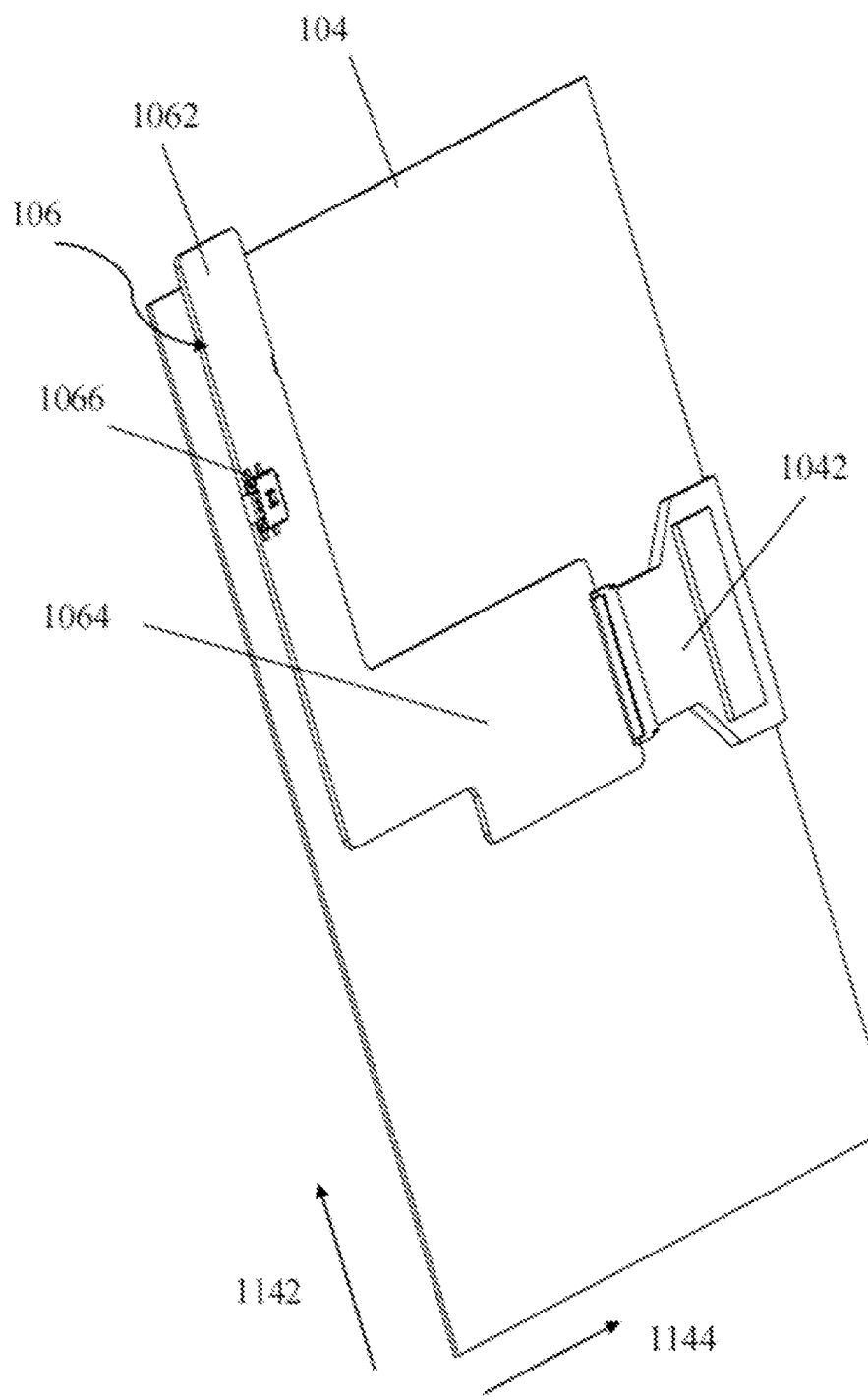
FIG. 3 is an exemplary assembly diagram of a display panel and a first circuit board according to an embodiment of the present disclosure.

FIG. 3 is an exemplary assembly diagram of a display panel 104 and a first circuit board 106 according to an embodiment of the present disclosure. As shown in FIG. 3, in some embodiments, the first circuit board 106 includes a first extension portion 1062 and a second extension portion 1064, wherein the first extension portion 1062 and the second extension portion 1064 are connected. The first extension portion 1062 may extend along the first direction 1142 and may be attached to the display panel 104, and the second extension portion 1064 may extend in the second direction 1144 and may be attached to the display panel 104, wherein the first direction is intersected with the second direction. As such, by attaching the first extension portion 1062 and the second extension 1064 of the first circuit board 106 to the display panel 104 and extending these two extension portions in different directions, the first circuit board 106 having a hardness may be used to support the display panel 104, which reinforces the hardness of the display panel 104 and improves product stability.

In some embodiments, the display panel 104 may be a flexible display panel, such that the hardness of the first circuit board 106 may be used to better support the display panel 104. For example, the display panel 104 may be an electrophoretic display (EPD) panel. Since the hardness of the electrophoretic display panel is relatively low, the first circuit board 106 is used to reinforce the hardness, which achieves better results.

In some embodiments, the display device 100 may be an electronic badge, such that the display function is implemented using the EPD panel, and with low power consumption performance of the EPD panel, endurance of the electronic badge is improved.

It should be understood that the first direction 1142 and the second direction 1144 shown in FIG. 3 are orthogonal to each other. However, in fact, the directions of the two extensions of the first circuit board 106 may not be perpendicular to each other but the included angle may be an acute or an obtuse angle, which also provides support for the display panel 104. For example, one of the extension portions of the first circuit board 106 may extend in a third direction, and an included angle between the third direction and the first direction 1142 or between the third direction and the second direction 1144 may be an acute or an obtuse angle.

In some embodiments, as shown in FIG. 3, a securing mechanism 1042 may also be disposed on the display panel 104 to secure a connection to the first circuit board 106. In addition, the traces of the display panel 104 may also be connected to the first circuit board 106 by the securing mechanism 1042. In some embodiment, the securing mechanism 1042 includes, but is not limited to, a flexible circuit board, a chip on film (COF), or the like. In some embodiments, circuitry associated with the driving display panel 104 may also be disposed on the first circuit board 106.

Figure 4:
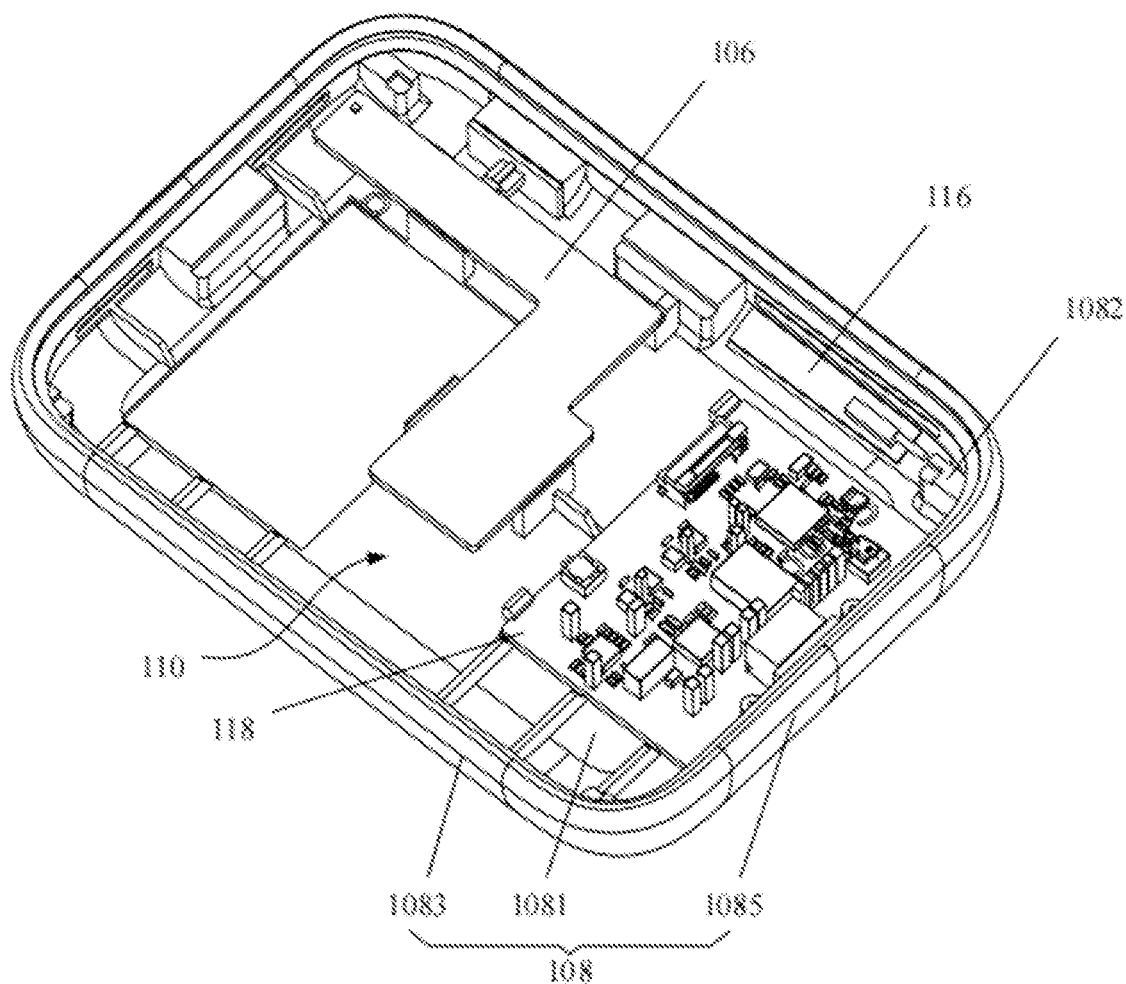
FIG. 4 is an exemplary position diagram of the Bluetooth module and the second circuit board in the rear housing according to an embodiment of the present disclosure.

Referring to FIG. 2 again, the display device 100 may also include a second circuit board 118. FIG. 4 is an exemplary position diagram of the Bluetooth module and the second circuit board in the rear housing according to an embodiment of the present disclosure. The second circuit board 118 may also be disposed in the accommodation space 110 in conjunction with FIGS. 2 and 4. In some embodiments, as shown in FIG. 4, the second circuit board 118 may be disposed on a side, opposite to the first extension portion 1062, of the second extension portion 1064 of the first circuit board 106, such that the accommodation space 110 may be fully utilized, thereby improving the compactness.

In the embodiments of the present disclosure, the second circuit board 118 and the first circuit board 106 are electrically connected. In some examples, first connectors are disposed on the second circuit board 118 and the first circuit board 106, second connectors are disposed at two ends of the signal line (not shown), and the second connectors at both ends of the signal line are connected to the corresponding first connectors, such that the second circuit board 118 and the first circuit board 106 are electrically connected.

In some embodiments, the rear housing 108 includes a bottom plate 1081, two first side plates 1083 and two second side plates 1085, wherein two first side plates 1083 are parallel and extend in the first direction 1142, two second side plates are parallel and extend in the second direction 1144, and two second side plates 1085 are connected between the two first side plates 1083 to form a rectangular frame which is disposed around an edge of the bottom plate 1081.

In some embodiments, as shown in FIG. 2, the display device 100 may also include a Bluetooth module 116. FIG. 4 is an exemplary position diagram of the Bluetooth module and the second circuit board in the rear housing according to an embodiment of the present disclosure. As shown in FIG. 4, the Bluetooth module 116 is disposed in the accommodation space 110 along the sides (or edges) of the rear housing 108. Exemplarily, the Bluetooth module 116 may be attached to an inner wall or an inner side wall of the rear housing 108.

Figure 5:
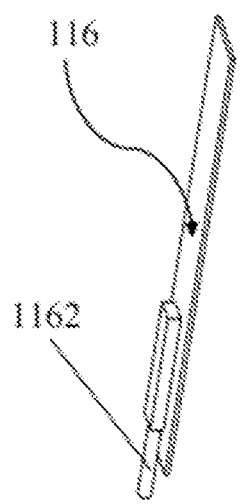
FIG. 5 is an exemplary structure diagram of a Bluetooth module according to an embodiment of the present disclosure.

FIG. 5 is an exemplary structure diagram of a Bluetooth module according to an embodiment of the present disclosure. As shown in FIG. 5, the Bluetooth module 116 is an elongated strip, and a length direction of the Bluetooth module 116 is consistent with the extension direction of the side of the rear housing. With the elongated Bluetooth module, the Bluetooth module 116 is conveniently fitted to the inner wall or inner side wall of the rear housing 108. With this design, the Bluetooth module 116 does not need to be integrated on the circuit board but may be disposed on the inner wall or the inner side wall of the rear housing 108, which is conducive to signal transmission and reception of the Bluetooth module 116.

Herein, the surface, for defining the accommodation space 110, of the bottom plate 1082 is an inner wall of the rear housing 108, and the surface of the first side plate 1084 and the second side plate 1086 for defining the accommodation space 110 is an inner side wall of the rear housing 108. In some embodiments, the surfaces of the first side plate 1084 and the second side plate 1086 for defining the accommodating space 110 and the surface of the bottom plate 1082 for defining the accommodating space 110 may be collectively referred to as the inner wall of the rear housing 108.

As shown in FIG. 4, the display device further includes an electrical connection portion 1082 corresponding to the Bluetooth module 116, wherein the electrical connection portion 1082 may be electrically connected to the second circuit board 118, and the Bluetooth module 116 may further include a pin member 1162 (as shown in FIG. 5) which may be snap-fitted to the electrical connection portion 1082 to achieve an electrical connection between the Bluetooth module 116 and the second circuit board 118.

Figure 6:
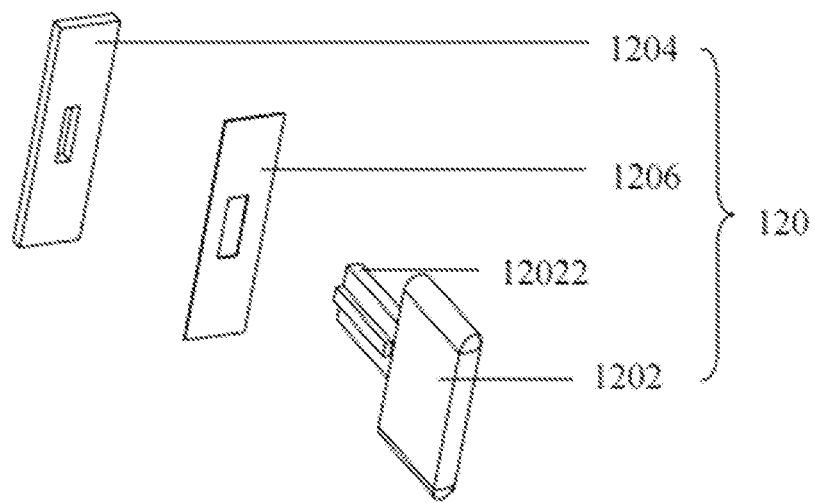
FIG. 6 is a schematic diagram of a structural exploded view of an exemplary button according to an embodiment of the present disclosure.

Referring to FIG. 2 again, the display device 100 may also include a button 120. FIG. 6 is a schematic diagram of an exemplary exploded structure of a button according to an embodiment of the present disclosure. As shown in FIG. 6, the button 120 may further include a plastic body 1202, a waterproof double-sided adhesive 1206, and a silicone gasket 1204 assembled in sequence, wherein the waterproof double-sided adhesive 1206 and silicone gasket 1204 are sequentially sleeved onto the plastic body. Upon assembling, a partially exposed area, toward one side of the plastic body 1202, is disposed on the waterproof double-sided adhesive 1206, which may be adhered to the inner side wall of the rear housing 108.

Figure 7:
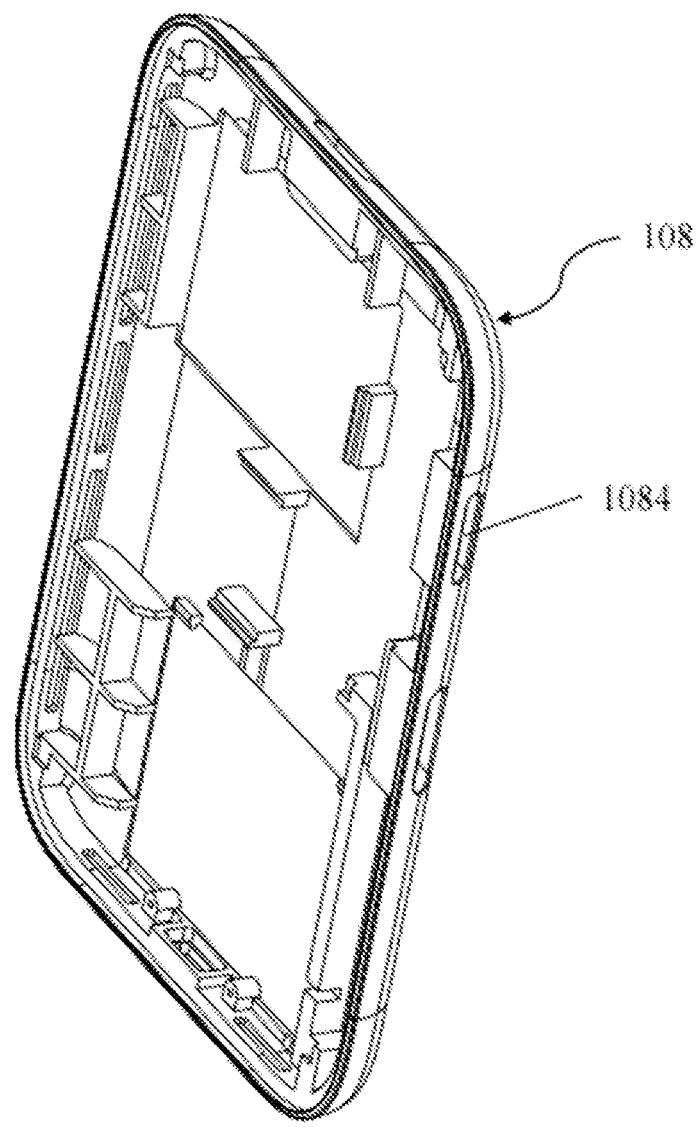
FIG. 7 is an exemplary structural schematic diagram of a rear housing according to an embodiment of the present disclosure.

FIG. 7 is an exemplary structural schematic diagram of a rear housing according to an embodiment of the present disclosure. As shown in FIG. 7, a first through hole 1084 may be disposed on the side wall of the rear housing 108 (i.e., the first side panel 1083), the plastic body 1202 may pass through the first through hole 1084 and the side of the waterproof double-sided adhesive 1206 facing the rear housing 108 may be adhered to the inner side wall of the rear housing 108, such that the button 120 is fixed to the side wall of the rear housing 108, and the end of the plastic body 1202 is at least partially exposed outside the rear housing 108.

Figure 8:
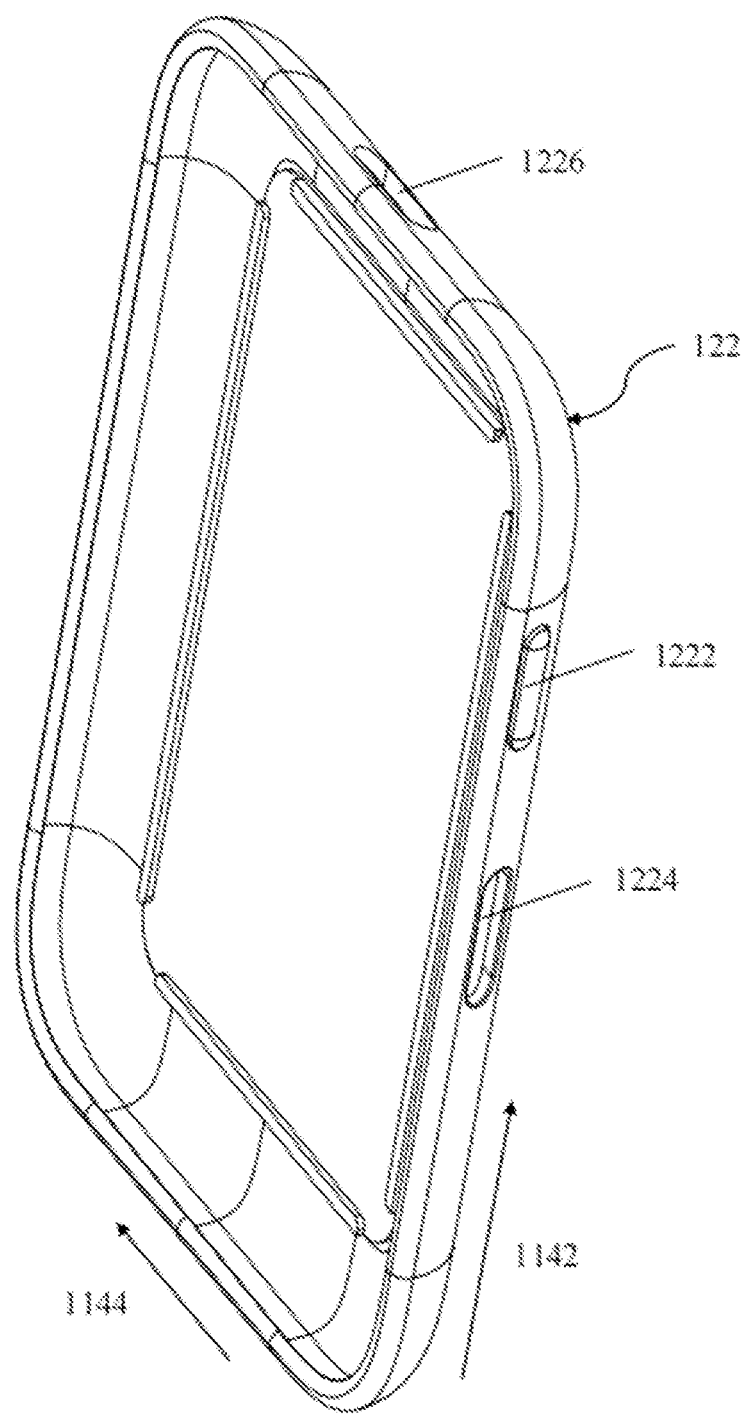
FIG. 8 is an exemplary structure diagram of a silicone housing according to an embodiment of the present disclosure.

FIG. 8 is an exemplary structure diagram of a silicone housing according to an embodiment of the present disclosure. As shown in FIGS. 2 and 8, the display device 100 may further include a silicone housing 122.

Figure 9:
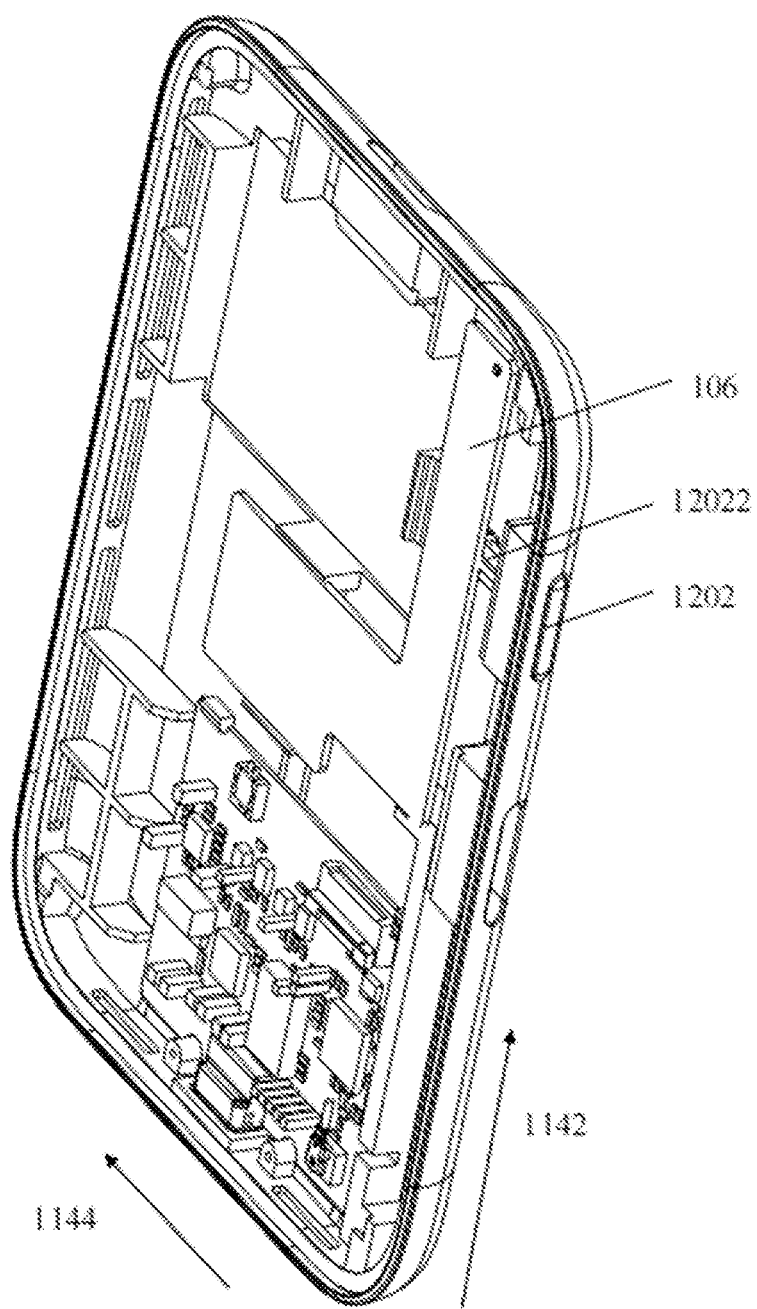
FIG. 9 is an exemplary internal structure diagram of a display device covered with a silicone housing according to an embodiment of the present disclosure.

FIG. 9 is an exemplary internal structure diagram of a display device covered with a silicone housing according to an embodiment of the present disclosure. As seen in FIG. 9, the rear housing 108 may be snap-fitted to the silicone housing 122, such that the silicone housing 122 protects the rear housing 108.

In some embodiments, as shown in FIGS. 8 and 9, the silicone housing 122 is provided with a second through hole 1222 at a position corresponding to the first through hole 1084, the plastic body 1202 may pass through the second through hole 1222, and the plastic body 1202 may be partially exposed outside the silicone housing 122, as shown in FIG. 9.

In some embodiments, as shown in FIG. 3, the first circuit board 106 may also be provided with a button switch module 1066 configured to receive a button signal, and at the same time, the first circuit board 106 may also be provided with a corresponding driving circuit related to the button.

As shown in FIG. 9, in some embodiments, the position on the first circuit board 106 where the button switch module 1066 is provided also corresponds to the position of the first through hole 1084 and the second through hole 1222. The plastic body 1202 may include a stem protrusion 12022, wherein the stem protrusion extends toward the first circuit board 106, such that in the case that the button 120 is installed, the stem protrusion 12022 may be in contact with or proximate to the button switch module 1066. In this way, in the case that the button 120 is pressed, the stem protrusion 12022 applies a force to the button switch module 1066 to generate a button signal.

In some embodiments, as shown in FIGS. 1 and 2, the display device 100 may further include a hook 124. The hook 124 may be configured to thread a cord to facilitate carry-up of the display device 100 by the user. The hook 124 may be connected to the side wall of the silicone housing 122. For example, as shown in FIG. 1, the hook 124 may be disposed on a second side wall of the silicone housing 122 extending in the second direction 1144. In some embodiments, the hook 124 may also be disposed on a first side wall of the silicone housing 122 extending in the first direction 1142.

As shown in FIG. 8, in some embodiments, a third through hole 1224 may be provided on a first side wall of the silicone housing 122 extending in the first direction 1142, and a fourth through hole 1226 may be provided on a second side wall of the silicone housing 122 extending in the second direction 1144. Both the third through hole 1224 and the fourth through hole 1226 may allow the hook 124 to pass through, such that the hook 124 may be disposed on the side walls of the display device 100 in two directions, which is convenient for the user to use the display device 100 vertically or horizontally.

Figure 10:
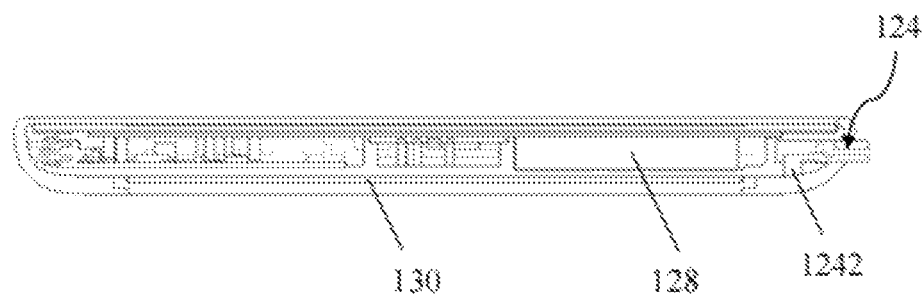
FIG. 10 is a schematic cross-sectional structure diagram of a display device according to an embodiment of the present disclosure.
Figure 11:
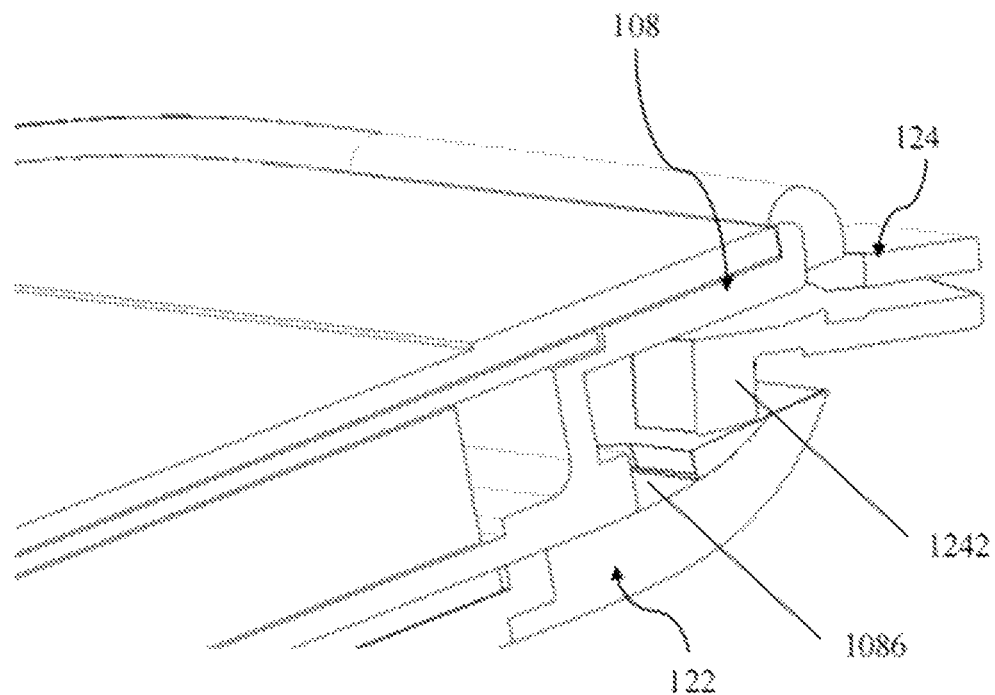
FIG. 11 is an exemplary enlarged structure diagram of the cross-sectional structure of the display device at the position of the hook according to an embodiment of the present disclosure.

FIG. 10 is a schematic cross-sectional structure diagram of a display device 100 according to an embodiment of the present disclosure. FIG. 11 is an exemplary enlarged structure diagram of the cross-sectional structure of the display device 100 at the position of the hook 124 according to an embodiment of the present disclosure. As shown in FIGS. 10 and 11, a second groove 1086 is disposed at a position, corresponding to the fourth through hole 1226, of the rear housing 108, one end of the hook 124 includes a hook-shaped protrusion 1242, wherein the hook 124 may pass through the fourth through hole 1226 (i.e., the hook 124 is disposed in the fourth through hole 1226) and is snap-fitted to the second groove 1086. In this way, in the case that the hook 124 is fixed on the display device 100, since the hook-shaped protrusion 1242 is snap-fitted to the second groove 1086, stability of the hook 124 is improved. Similarly, a first groove (not shown) may be disposed at a position, corresponding to the third through hole 1224, of the rear housing 108, and the hook-shaped protrusion 1242 of the hook 124 may pass through the third through hole 1224 (that is, the hook 124 is disposed in the third through hole 1224) and may be snap-fitted to the first groove.

In some embodiments, as shown in FIG. 2, the display device 100 may further include a through hole plug 126. The through hole plug 126 may be inserted and fixed into one of the third through hole 1224 and the fourth through hole 1226 where the hook 124 is not disposed, so as to seal the through hole where the through hole plug 126 is inserted. For example, in the case that the hook 124 is disposed in the third through hole 1224, the through hole plug 126 may be used to seal the fourth through hole 1226, thereby resisting dust and water. Similarly, in the case that the hook 124 is disposed in the fourth through hole 1226, the through hole plug 126 may be used to seal the third through hole 1224, thereby resisting dust and water.

In some embodiments, as shown in FIG. 10, the display device 100 may also include a battery 128. The battery 128 may be disposed in a space (the space above the first circuit board 106 as shown in FIG. 9) enclosed by the first extension portion 1062 and the second extension portion 1064 of the first circuit board 106, thereby improving product integration and compactness.

In some embodiments, as shown in FIG. 10, the display device 100 may further include a badge 130 interposed between the silicone housing 122 and the rear housing 108.

In the display device according to the embodiments of the present disclosure, the cover plate, the rear housing, the EPD, the PCB, the battery, the card, and the silicone housing are assembled together by smart design, such that the Bluetooth signal of the product is bettered with a sufficient strength, besides the advantages of waterproofing, lightweight, and low cost.

Described above are only exemplary embodiments of the present disclosure, and are not intended to limit the present disclosure. Those skilled in the art could make various modifications and variations for the present disclosure. Any omissions, modifications, equivalents, improvements, and the like, which may be made within the spirit and principles of the present disclosure, should be embraced within the protection scope of the present disclosure.

What is claimed is:

1. A display device, comprising: a cover plate, a display panel, a first circuit board, and a rear housing; wherein
   the cover plate is connected to the rear housing to form an accommodation space;
   the display panel is assembled with the first circuit board, wherein both the display panel and the first circuit board are disposed in the accommodation space; and
   the first circuit board comprises a first extension portion and a second extension portion, wherein the first extension portion and the second extension portion are connected, the first extension portion extends in a first direction and is attached to the display panel, and the second extension portion extends in a second direction and is attached to the display panel, the first direction being intersected with the second direction, the display device further comprising a Bluetooth module and a second circuit board; wherein
   the Bluetooth module and the second circuit board are disposed in the accommodation space, the Bluetooth module is attached to an inner wall of the rear housing, and the Bluetooth module and the second circuit board are electrically connected.

2. The display device according to claim 1, wherein the first direction is perpendicular to the second direction.

3. The display device according to claim 2, wherein the rear housing comprises: a bottom plate, two first side plates, and two second side plates; wherein
   the two second side plates are connected between the two first side plates to form a rectangular frame, wherein the rectangular frame is disposed around an edge of the bottom plate; and
   the first side plate extends in the first direction and the second side plate extends in the second direction.

4. The display device according to claim 1, wherein the display panel comprises a flexible display panel.

5. The display device according to claim 1, wherein the display panel comprises an electrophoretic display panel.

6. The display device according to claim 5, wherein the display device comprises an electronic badge.

7. The display device according to claim 1, wherein the Bluetooth module comprises an elongated strip, the Bluetooth module is attached to the inner wall of the rear housing, and a lengthwise direction of the Bluetooth module is the same as an extension direction of the side of the rear housing.

8. The display device according to claim 1, further comprising an electrical connection portion; wherein
the electrical connection portion is disposed in the accommodation space, and the electrical connection portion is electrically connected to the second circuit board; and
the Bluetooth module comprises a pin, wherein the pin is snap-fitted to the electrical connection portion to achieve an electrical connection between the Bluetooth module and the second circuit board.

9. The display device according to claim 1, wherein the second circuit board is disposed on a side, opposite to the first extension portion, of the second extension portion.

10. The display device according to claim 1, further comprising a button; wherein
the button comprises a plastic body, a waterproof double-sided adhesive, and a silicone gasket, wherein the waterproof double-sided adhesive and the silicone gasket are sequentially sleeved on the plastic body;
a first through hole is disposed on a side plate of the rear housing, wherein the plastic body is disposed in the first through hole and the waterproof double-sided adhesive is adhered to an inner wall of the side plate of the rear housing.

11. The display device according to claim 10, further comprising a silicone housing, wherein the rear housing is snap-fitted to the silicone housing, and a second through hole is disposed on the silicone housing, wherein the second through hole is disposed at a position opposite to the first through hole, and the plastic body is disposed in the second through hole, and is exposable outside the silicone housing.

12. The display device according to claim 11, further comprising a hook, wherein the hook is connected to a side wall of the silicone housing.

13. The display device according to claim 12, wherein the silicone housing comprises a first side wall extending in the first direction and a second side wall extending in the second direction, wherein a third through hole is disposed on the first side wall, and a fourth through hole is disposed on the second side wall, wherein a first groove is disposed on a position, corresponding to the third through hole, of the rear housing, and a second groove is disposed on a position, corresponding to the fourth through hole, of the rear housing; and wherein
one end of the hook comprises a hook-shaped protrusion, and the hook is disposed in one of the following fashions:
the hook is disposed in the third through hole and the hook-shaped protrusion is snap-fitted to the first groove; and
the hook is disposed in the fourth through hole and the hook-shaped protrusion is snap-fitted to the second groove.

14. The display device according to claim 13, further comprising a through hole plug, wherein the through hole plug is configured to be inserted into one of the third through hole and the fourth through hole in which the hook is not disposed, to seal the through hole.

15. The display device according to claim 1, further comprising a battery, wherein the battery is disposed in the accommodation space and in a space enclosed by the first extension portion and the second extension portion.

16. The display device according to claim 11, further comprising a badge, wherein the badge is interposed between the silicone housing and the rear housing.

17. The display device according to claim 1, wherein the cover plate and the rear housing are bonded to each other by a waterproof double-sided adhesive.

* * * * *